US012124860B2

(12) United States Patent
Chang

(10) Patent No.: US 12,124,860 B2
(45) Date of Patent: Oct. 22, 2024

(54) METHOD AND MICROCONTROLLER FOR DRIVING IN-SYSTEM-PROGRAMMING

(71) Applicant: Nuvoton Technology Corporation, Hsinchu (TW)

(72) Inventor: Wen-Shuo Chang, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 81 days.

(21) Appl. No.: 17/828,555

(22) Filed: May 31, 2022

(65) Prior Publication Data

US 2023/0259369 A1 Aug. 17, 2023

(30) Foreign Application Priority Data

Feb. 16, 2022 (TW) .................................. 111105526

(51) Int. Cl.
*G06F 9/44* (2018.01)
*G06F 9/4401* (2018.01)
*G06F 9/445* (2018.01)
*G06F 9/448* (2018.01)

(52) U.S. Cl.
CPC .......... *G06F 9/4482* (2018.02); *G06F 9/4401* (2013.01); *G06F 9/44589* (2013.01)

(58) Field of Classification Search
CPC ...................................................... G06F 9/44
See application file for complete search history.

(56) References Cited

U.S. PATENT DOCUMENTS

| 5,248,900 A | * | 9/1993 | Davis | ....................... H03K 7/08 |
| | | | | 327/295 |
| 5,841,867 A | * | 11/1998 | Jacobson | ....... G01R 31/318547 |
| | | | | 714/38.11 |
| 2007/0169086 A1 | * | 7/2007 | Cheng | ....................... G06F 8/65 |
| | | | | 717/168 |
| 2009/0113196 A1 | * | 4/2009 | Jan | ......................... G06F 8/654 |
| | | | | 713/2 |
| 2013/0132700 A1 | | 5/2013 | Liu et al. | |
| 2014/0258729 A1 | | 9/2014 | Maletsky et al. | |

(Continued)

FOREIGN PATENT DOCUMENTS

CN 102750156 A 10/2012
CN 105701412 A 6/2016

(Continued)

OTHER PUBLICATIONS

An Office Action in corresponding TW Application No. 111105526 dated Jan. 19, 2023 is attached, 8 pages.

(Continued)

*Primary Examiner* — Jae U Jeon
(74) *Attorney, Agent, or Firm* — Muncy, Geissler, Olds & Lowe, P.C.

(57) ABSTRACT

A method for driving in-system programming is provided. The method includes receiving a set of driving codes; setting an in-system-programming flag according to the set of driving codes; executing a system reset after the in-system-programming flag is set; detecting whether there is an in-system-programming flag after the system reset is finished; and executing an in-system-programming procedure when an in-system-programming flag is detected.

10 Claims, 3 Drawing Sheets

(56) References Cited

U.S. PATENT DOCUMENTS

2021/0337117 A1* 10/2021 Cai ................ H04N 23/631
2022/0179740 A1*  6/2022 Roy ................ G11C 29/42

FOREIGN PATENT DOCUMENTS

TW       501061      9/2002
TW    202125228 A    7/2021

OTHER PUBLICATIONS

An Office Action in corresponding TW Application No. 111105526 mailed Jul. 18, 2022 is attached, 5 pages.
A Search Report in corresponding TW Application No. 111105526 mailed Jul. 18, 2022 is attached, 1 page.

* cited by examiner

METHOD AND MICROCONTROLLER FOR DRIVING IN-SYSTEM-PROGRAMMING

CROSS REFERENCE TO RELATED APPLICATIONS

This application claims the benefit of Taiwan Application No. 111105526, filed on Feb. 16, 2022, the entirety of which is incorporated by reference herein.

BACKGROUND OF THE INVENTION

Field of the Invention

The present invention relates to a method for in-system programming, and, in particular, to a method and a microcontroller for driving in-system programming.

Description of the Related Art

There are three existing methods for initiating in-system programming (ISP). Method 1, uses the high level or low level of a specific input and output pin to determine whether to activate the ISP. Method 2 uses the boot options recorded in the non-volatile memory to determine whether to activate the ISP. Method 3 detects whether a connection request is received and uses a timeout mechanism to determine whether to activate the ISP.

For method 1 to function, the designer needs to design additional buttons, jumpers, or test points accordingly. In method 2, it is not easy to change the decision whether to execute the ISP, and this change cannot be made at any time. In method 3, in order to detect whether there is an ISP connection requirement, additional waiting and detection time is required, resulting in a boot delay.

BRIEF SUMMARY OF THE INVENTION

An embodiment of the present invention provides a method for driving in-system programming (ISP). The method includes receiving a set of driving codes; setting an in-system-programming flag according to the set of driving codes; executing a system reset after the in-system-programming flag is set; detecting whether there is an in-system-programming flag after the system reset is finished; and executing an in-system-programming procedure when an in-system-programming flag is detected.

The method further includes executing a normal boot procedure when an in-system-programming flag is not detected.

According to the method described above, the step of setting the in-system-programming flag according to the set of driving codes includes checking whether the received set of driving codes matches at least one verification code, and setting the in-system-programming flag when the received set of driving codes matches the verification code.

According to the method described above, the step of setting the in-system-programming flag according to the set of driving codes, a set of second driving codes, and a set of third driving codes includes the following steps. The method checks whether the received set of driving codes matches at least one verification code. The method increases the count value by one when the received set of driving codes matches the verification code. The method checks whether the received set of second driving codes matches at least one verification code. The method checks whether the received set of second driving codes matches at least one verification code. The method increases the count value by one when the received set of second driving codes matches the verification code. The method checks whether the received set of third driving codes matches at least one verification code. The method increases the count value by one when the received set of third driving codes matches the verification code. The method sets the in-system-programming flag when the count value is equal to a preset value.

The method further includes setting a reset delay time after the in-system-programming flag is set and executing the system reset after waiting for the reset delay time.

The present invention also provides a microcontroller to drive in-system programming. The microcontroller includes a communication processing unit. The communication processing unit includes a buffer, a reset circuit, and an executing unit. The buffer is configured to receive a set of driving codes. The reset circuit is configured to execute the following steps of setting an in-system-programming flag according to the set of driving codes and executing a system reset after the in-system-programming flag is set. The executing unit is configured to execute the following steps of detecting whether there is an in-system-programming flag after the system reset is finished and executing an in-system-programming procedure when an in-system-programming flag is detected.

According to the microcontroller described above, the executing unit executes a normal boot procedure when the executing unit does not detect the in-system-programming flag.

According to the microcontroller described above, the reset circuit checks whether the received set of driving codes matches at least one verification code. The reset circuit sets the in-system-programming flag when the received set of driving codes matches the verification code.

According to the microcontroller described above, the communication processing unit further includes a matching counter to store the count value.

According to the microcontroller described above, the reset circuit checks whether the received set of driving codes matches at least one verification code. The matching counter increases the count value by one when the received set of driving codes matches the verification code. The reset circuit checks whether a received set of second driving codes matches at least one verification code. The matching counter increases the count value by one when the received set of second driving codes matches the verification code. The reset circuit checks whether a received set of third driving codes matches at least one verification code. The matching counter increases the count value by one when the received set of third driving codes matches the verification code. The reset circuit sets the in-system-programming flag when the count value is equal to a preset value.

According to the microcontroller described above, the reset circuit sets a reset delay time after the in-system-programming flag is set. The reset circuit executes the system reset after waiting for the reset delay time.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
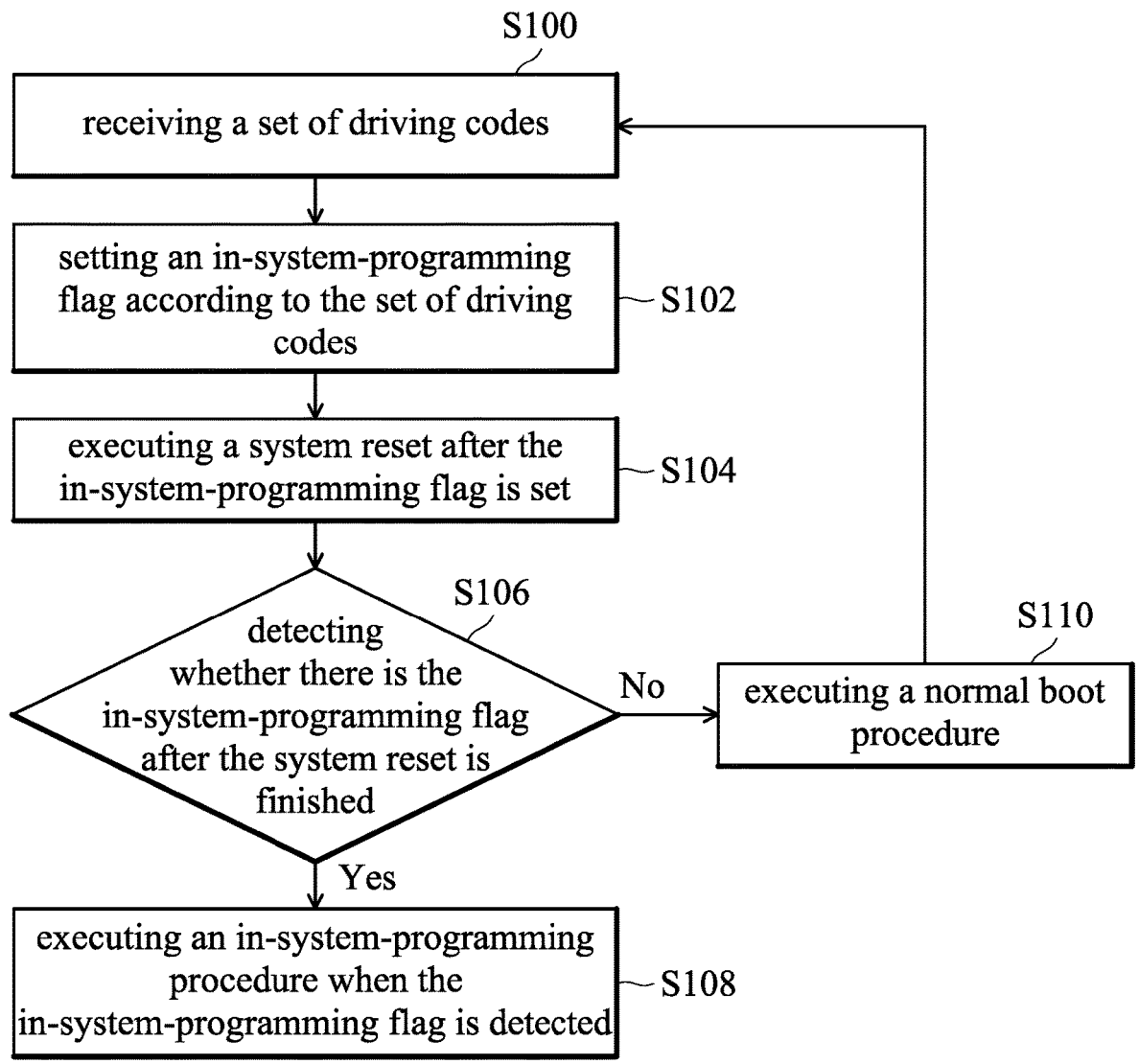
FIG. 1 is a flow chart of a method for driving in-system programming (ISP) in accordance with some embodiments of the present invention.

FIG. 1 is a flow chart of a method for driving in-system programming (ISP) in accordance with some embodiments of the present invention. As shown in FIG. 1, the method for driving ISP includes: receiving a set of driving codes (step S100); setting an in-system-programming flag according to the set of driving codes (step S102); executing a system reset after the in-system-programming flag is set (step S104); detecting whether there is an in-system-programming flag after the system reset is finished (step S106); and executing an in-system-programming procedure when an in-system-programming flag is detected (step S108). In some embodiments, when the in-system-programming flag is not detect in step S106, the method for driving ISP of the present invention executes step S110, that is, a normal boot procedure is performed. If in the normal boot procedure, the method for driving ISP of the present invention receives another set of driver codes again, the method of the present invention returns to step S100 and executes steps S102 to S106 in sequence.

In step S100, the driving code can be, for example, a driving code with 16 bytes, for example, the driving code is (a2 d3 09 46 dc 4c ad 66), but the present invention is not limited thereto. In some embodiments, the method of the present invention receives the driver code through a communication protocol in step S100. The communication protocol includes Universal Asynchronous Receiver/Transmitter (UART) protocol, Inter-Integrated Circuit (I²C) protocol, Serial Peripheral Interface Bus (SPI) protocol, and Controller Area Network (CAN) protocol, but the present invention is not limited thereto.

In step S102, the method for driving ISP first checks whether the received set of driving codes matches at least one verification code. When the received set of driving codes matches the verification code, the method sets the in-system-programming flag. For example, it is assumed that all verification codes of the method of the present invention include a set of 16-bytes code (a2 d3 09 46 dc 4c ad 66). The 16-bytes code is the same as the driving code received in step S100, so the method sets the in-system-programming flag accordingly. In some embodiments, the in-system-programming flag is set in a register. For example, when the method has not set the in-system-programming flag, the data in the register is 0. When the method of the present invention has set the in-system-programing flag, the data in the register is 1. The present invention only takes 1-bit register as an example, but the present invention does not limit the number of bits of the register.

In some embodiments, the method receives more than one set of driving codes in step S100. For example, the method of the present invention receives the driving code (a2 d3 09 46 dc ad 66), the driving code (7e 95 c2 e8 9e 06 44 09), and the driving code (74 4f 51 a5 26 91 b4 0a) in sequence. Therefore, the method of the present invention may set the in-system-programing flag in step S102 according to the driving code (a2 d3 09 46 dc ad 66), the driving code (7e 95 c2 e8 9e 06 44 09), and the driving code (74 4f 51 a5 26 91 b4 0a). In detail, when the method of the present invention receives the driving code (a2 d3 09 46 dc ad 66), the method of the present invention first checks whether the received driving code (a2 d3 09 46 dc ad 66) matches at least one verification code. If at least one set of verification codes matches the driving code (a2 d3 09 46 dc ad 66), the method increases the count value by one. If none of the verification codes match the driving code (a2 d3 09 46 dc ad 66), the method of the present invention resets the count value to zero. In some embodiments, the count value is stored in a counter, but the present invention is not limited thereto.

Then, when the method of the present invention receives the driving codes (7e 95 c2 e8 9e 06 44 09), the method checks again whether the received driving code (7e 95 c2 e8 9e 06 44 09) matches the verification code. If at least one set of verification codes matches the driving code (7e 95 c2 e8 9e 06 44 09), the method of the present invention increases the count value by one. If none of the verification codes match the driving code (7e 95 c2 e8 9e 06 44 09), the method resets the count value to zero. Similarly, when the method of the present invention receives the driving codes (74 4f 51 a5 26 91 b4 0a), the method checks again whether the received driving code (74 4f 51 a5 26 91 b4 0a) matches the verification code. If at least one set of verification codes matches the driving code (74 4f 51 a5 26 91 b4 0a), the method of the present invention increases the count value by one. If none of the verification codes match the driving code (74 4f 51 a5 26 91 b4 0a), the method of the present invention resets the count value to zero.

In some embodiments, when the count value is equal to a preset value (for example, the count value is equal to 3), the method of the present invention sets the in-system-programming flag. Briefly speaking, the method of the present invention needs to receive three consecutive driving codes that can match the verification code in step S100, so that the method of the present invention sets the in-system-programming flag in step S102. In contrast, when the method of the present invention does not receive three consecutive driving codes that can match the verification code, the method of the present invention resets the count value to zero, and does not set the in-system-programming flag in step S102. For example, the method of the present invention continuously receives the driving code (a2 d3 09 46 dc ad 66), the driving code (7e 95 c2 e8 9e 06 44 09), and the driving code (74 4f 51 a5 26 91 b4 0a). However, the driving code (74 4f 51 a5 26 91 b4 0a) does not match the verification code, so the method of the present invention does not set the in-system-programming flag in step S102 until three consecutive driving codes that match the verification code are received.

In some embodiments of step S104, the method further sets a reset delay time after the in-system-programming flag is set. After waiting for the reset delay time, the method of the present invention executes the system reset. For example, the method of the present invention may set the reset delay time as 3 seconds in step S104. Therefore, after the method of the present invention completes the setting of the in-system-programming flag, the method of the present invention waits for the reset delay time of 3 seconds before executing the system reset.

In step S106, when the method of the present invention detects the in-system-programming flag set before the system reset, the method of the present invention executes an in-system-programming procedure in step S108. In some embodiments, in the in-system-programming procedure, the method of the present invention writes the code to be programed into a communication processing unit through the transmission of the communication protocol. The communication processing unit executes the code correspondingly to complete the in-system-programming procedure. In step S106, when the method of the present invention does not detect the in-system-programming flag set before the system reset, the method of the present invention executes a normal boot procedure in step S110. In the normal boot procedure, the method of the present invention returns to step S100 only when the driving code is received again, and correspondingly executes steps S102 to S106, otherwise the method of the present invention always remain in the normal boot procedure in step S110. In some embodiments, the method executes the code in the read-only memory of the system in the normal boot procedure. When the method of the present invention is executing the code in the ROM of the system, the method of the present invention can detect the in-system-programming flag.

Figure 2:
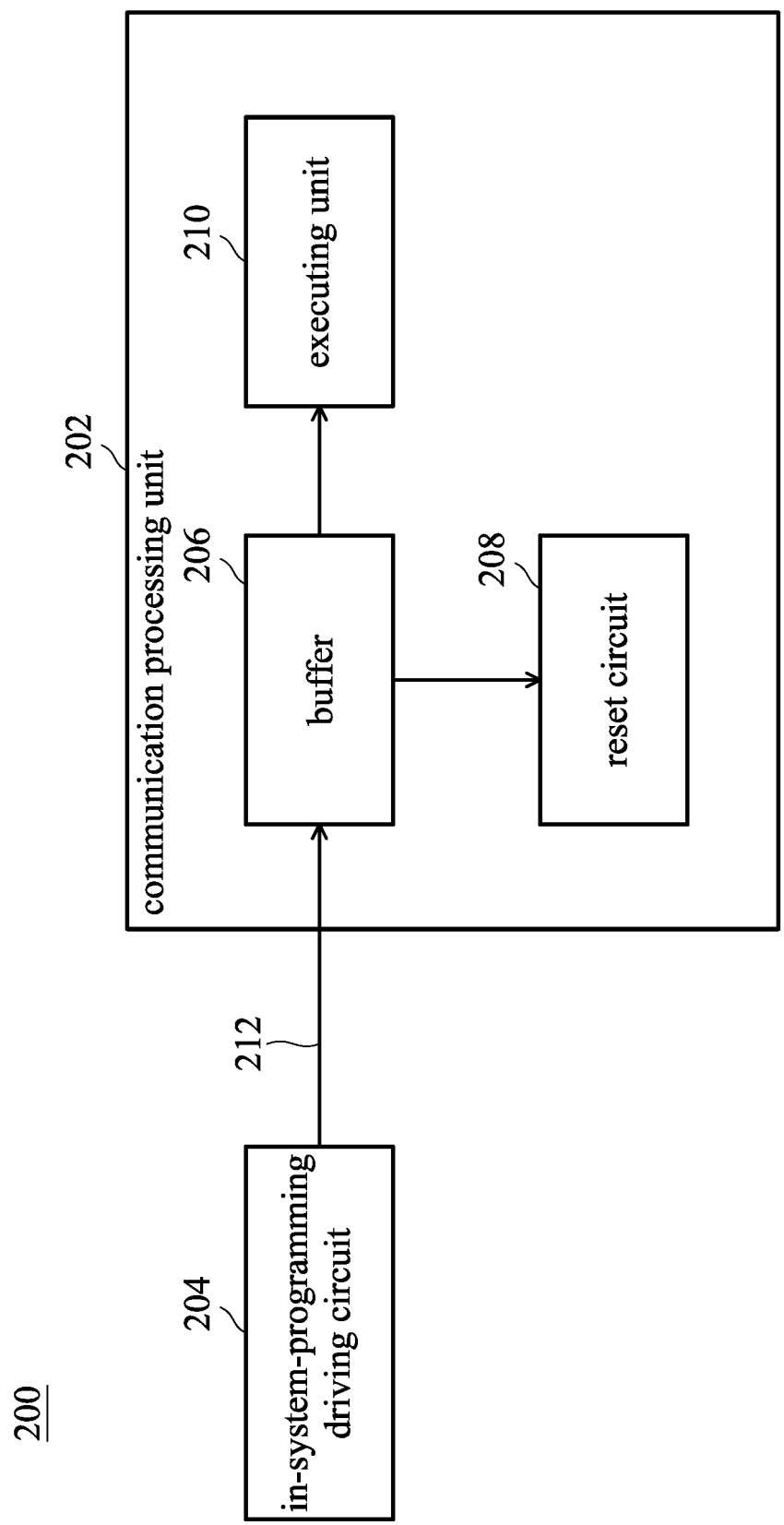
FIG. 2 is a schematic diagram of a microcontroller 200 in accordance with some embodiments of the present invention.

FIG. 2 is a schematic diagram of a microcontroller 200 in accordance with some embodiments of the present invention. As shown in FIG. 2, the microcontroller 200 includes a communication processing unit 202, and an in-system-programing driving circuit 204. In some embodiments, the communication processing unit 202 supports at least one of a plurality of communication protocols. For example, the communication protocols include UART, I²C, SPI and CAN, but the present invention is not limited thereto. The communication processing unit 202 includes a buffer 206, a reset circuit 208, and a executing unit 210. In some embodiments, the buffer 206 receives a set of driving code from the in-system-programming driving circuit 204. The buffer 206 may be, for example, a First-in-First-out buffer, but the present invention is not limited thereto. In some embodiments, the buffer receives the set of driving code from the in-system-programming driving circuit 204 through a communication protocol line 212. The communication protocol supported by the communication protocol line 212 is the same as the communication protocol supported by the communication processing unit 202, such as UART, I²C, SPI, and CAN.

The reset circuit 208 sets an in-system-programming flag according to the driving code. After the in-system-programming flag is set, the reset circuit 208 executes the reset of the microcontroller 200. In detail, the reset circuit checks whether the received driving code matches at least one verification code. When the received driving code matches the verification code, the reset circuit 208 sets the in-system-programming flag. In some embodiments, the reset circuit 208 set the in-system-programming flag in a register (not shown), but the present invention is not limited thereto. In some embodiments, after the reset circuit 208 finishes the setting of the in-system-programming flag, the reset circuit 208 sets a reset delay time. After waiting for the reset delay time, the reset circuit 208 executes the reset of the microcontroller 200.

After finishing the reset of the microcontroller 200, the executing unit 210 detects whether there is an in-system-programming flag. When an in-system-programming flag is detected, the executing unit 210 executes an in-system-programming procedure. In the in-system-programming procedure, the in-system-programming driving circuit 204 can write the code to be programmed into the communication processing unit 202 through the transmission of the communication protocol line 212. The executing unit 210 of the communication processing unit 202 can execute the code correspondingly to complete the in-system-programming procedure. In some embodiments, when the executing unit 210 does not detect the in-system-programming flag, the executing unit 210 executes a normal boot procedure. In the normal boot procedure, unless the buffer 206 receives another driving code, the executing unit 210 remains in the normal boot procedure. In some embodiments, the executing unit 210 executes the code in the ROM (not shown) of the microcontroller 200 in the normal boot procedure. When the executing unit 210 executes the code in the ROM of the microcontroller 200, the executing unit 210 can detect the in-system-programming flag.

Figure 3:
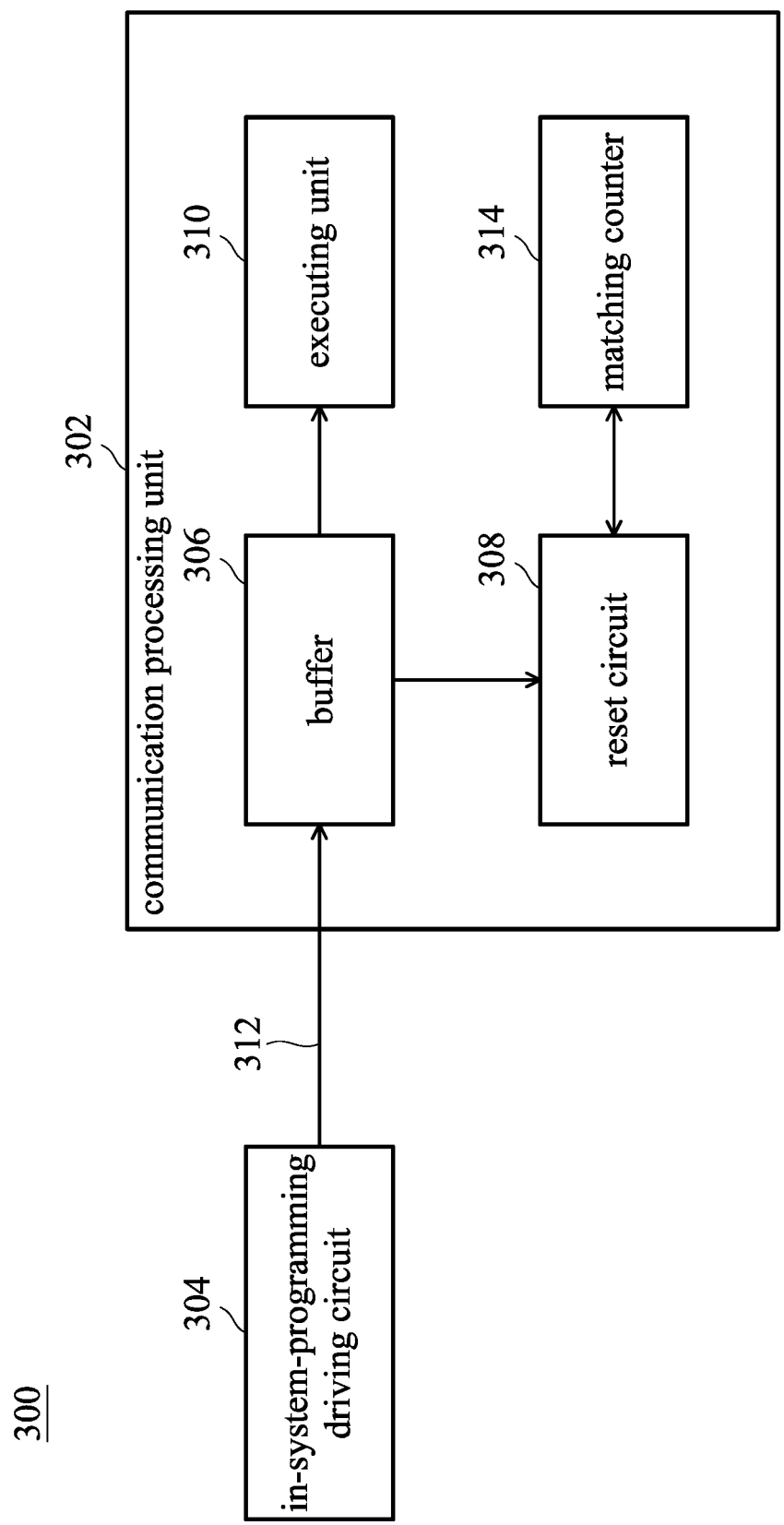
FIG. 3 is a schematic diagram of a microcontroller 300 in accordance with some embodiments of the present invention.

FIG. 3 is a schematic diagram of a microcontroller 300 in accordance with some embodiments of the present invention. As shown in FIG. 3, the microcontroller 300 includes a communication processing unit 302, and an in-system-programming driving circuit 304. In some embodiments, the communication processing unit 302 supports at least one of communication protocols. For example, the communication protocols include UART, I²C, SPI and CAN, but the present invention is not limited thereto. The communication processing unit 302 includes a buffer 306, a reset circuit 308, a executing unit 310, and a matching counter 314. In some embodiments, the buffer 306 receives several sets of driving codes from the in-system-programming driving circuit 304. The buffer 306 may be, for example, a First-in-First-out buffer, but the present invention is not limited thereto. In some embodiments, the buffer 306 receives several sets of driving codes from in-system-programming driving circuit 304 on the receiving line through a communication protocol line 312. The communication protocol supported by the communication protocol line 312 is the same as the communication protocol supported by the communication processing unit 302, such as UART, I²C, SPI, and CAN.

For example, the buffer 306 receives the driving code (a2 d3 09 46 dc ad 66), the driving code (7e 95 c2 e8 9e 06 44 09), and the driving code (74 4f 51 a5 26 91 b4 0a). Therefore, the reset circuit 308 sets the in-system-programming flag according to the driving code (a2 d3 09 46 dc ad 66), the driving code (7e 95 c2 e8 9e 06 44 09), and the driving code (74 4f 51 a5 26 91 b4 0a). In detailed, when the buffer 306 receives the driving code (a2 d3 09 46 dc ad 66), the reset circuit 308 first checks whether the received driving code (a2 d3 09 46 dc ad 66) matches at least one verification code. If at least one set of verification codes matches the driving code (a2 d3 09 46 dc ad 66), the matching counter 314 increases the count value by one. If none of the verification codes match the driving code (a2 d3 09 46 dc ad 66), the matching counter 314 resets the count value to zero.

Then, when the buffer 306 receives the driving codes (7e 95 c2 e8 9e 06 44 09), the reset circuit 308 checks again whether the received driving code (7e 95 c2 e8 9e 06 44 09) matches the verification code. If at least one set of verification codes matches the driving code (7e 95 c2 e8 9e 06 44 09), the matching counter 314 increases the count value by one. If none of the verification codes match the driving code (7e 95 c2 e8 9e 06 44 09), the matching counter 314 resets the count value to zero. Similarly, when the buffer 306 receives the driving codes (74 4f 51 a5 26 91 b4 0a), the buffer 306 checks again whether the received driving code (74 4f 51 a5 26 91 b4 0a) matches the verification code. If at least one set of verification codes matches the driving code (74 4f 51 a5 26 91 b4 0a), the matching counter 314 increases the count value by one. If none of the verification codes match the driving code (74 4f 51 a5 26 91 b4 0a), the matching counter 314 resets the count value to zero.

In some embodiments, when the count value in the matching counter 314 is equal to a preset value (for example, the count value is equal to 3), the reset circuit 308 sets the in-system-programming flag. Briefly speaking, the buffer 306 needs to receive three consecutive driving codes that can match the verification code, so that the reset circuit 308 sets the in-system-programming flag. In contrast, when the buffer 306 does not receive three consecutive driving codes that can match the verification code, the matching counter 314 resets the count value to zero, and the reset circuit 308 does not set the in-system-programming flag. For example, the buffer 306 continuously receives the driving code (a2 d3 09 46 dc ad 66), the driving code (7e 95 c2 e8 9e 06 44 09), and the driving code (74 4f 51 a5 26 91 b4 0a). However, the driving code (74 4f 51 a5 26 91 b4 0a) does not match the verification code, so the reset circuit 308 does not set the in-system-programming flag until the buffer 306 receives three consecutive driving codes that match the verification code.

The operations performed by the buffer 306, the reset circuit 308, and the executing unit 310 in FIG. 3 are the same as those performed by the buffer 206, the reset circuit 208, and the executing unit 210 in FIG. 2, thus no further description is given. In some embodiments, the executing unit 310 executes the code in the ROM (not shown) of the microcontroller 300 in the normal boot procedure. When the executing unit 310 executes the code in the ROM of the microcontroller 300, the executing unit 310 may continue to detect the in-system-programming flag. In some embodiments, the executing is usually an in-system-programming (ISP) function block (not shown) and a Universal Asynchronous Receiver/Transmitter (UART) protocol function block (not shown) in the microcontroller 300, but the present invention is not limited thereto.

In the mechanism of detecting the in-system-programming flag, the mechanism can be implemented by software monitoring or hardware monitoring. For example, all the data received by the system must pass through the detection software before being handed over to the system for processing, or the received data can be transmitted to the detection software and the system at the same time. In terms of hardware detection, the present invention can detect the receiving buffer of the receiving peripheral device at any time, and can directly trigger ISP reset if there are data that confirm to the rules. The method for driving in-system-programming and the microcontroller of the present invention provide an ISP function activation method that does not affect the boot time, does not require additional circuits, and does not affect user function operations.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for driving in-system programming (ISP), comprising: receiving a set of driving codes from an in-system-programing driving circuit;
setting an in-system-programming flag according to the set of driving codes;
storing the in-system-programming flag into a register;
executing a system reset after the in-system-programming flag is stored;
executing an in-system-programming procedure when the in-system-programming flag is read in the register after the system reset is finished;
wherein step of setting the in-system-programming flag according to the set of driving codes comprises:
setting the in-system-programming flag and increasing a count value when the received set of driving codes matches the at least one verification code;
resetting the count value to zero when the received set of driving codes does not match the at least one verification code.

2. The method as claimed in claim 1, further comprising:
executing a normal boot procedure when an in-system-programming flag is not detected.

3. The method as claimed in claim 1, wherein the step of setting the in-system-programming flag according to the set of driving codes, a set of second driving codes, and a set of third driving codes comprises:
checking whether the received set of driving codes matches at least one verification code;
increasing a count value by one when the received set of driving codes matches the at least one verification code;
checking whether the received set of second driving codes matches at least one verification code;
increasing the count value by one when the received set of second driving codes matches the at least one verification code;
checking whether the received set of third driving codes matches at least one verification code;
increasing the count value by one when the received set of third driving codes matches the at least one verification code; and
setting the in-system-programming flag when the count value is equal to a preset value.

4. The method as claimed in claim 3, further comprising:
resetting the count value to zero if none of the at least one verification code matches the received set of driving codes;
resetting the count value to zero if none of the at least one verification code matches the received set of second driving codes; and
resetting the count value to zero if none of the at least one verification code matches the received set of third driving codes.

5. The method as claimed in claim 1, further comprising:
setting a reset delay time after the in-system-programming flag is set; and
executing the system reset after the reset delay time.

6. A microcontroller to drive in-system programming, comprising: a communication processing unit, comprising:
a buffer, configured to receive a set of driving codes from an in-system-programing driving circuit driving circuit;
a reset circuit, configured to execute steps of setting an in-system-programming flag according to the set of driving codes, storing the in-system-programming flag into a register, and executing a system reset after the in-system-programming flag is set; and
an executing unit, configured to execute steps of executing an in-system-programming procedure when the in-system-programming flag is read in the register after the system reset is finished;
wherein the reset circuit sets the in-system-programming flag when the received set of driving codes matches at least one verification code; and wherein a matching counter increases a count value when the received set of driving codes matches the at least one verification code and reset the count value to zero when the received set of driving codes does not match the at least one verification code.

7. The microcontroller as claimed in claim 6, wherein the executing unit executes a normal boot procedure when the executing unit does not detect an in-system-programming flag.

8. The microcontroller as claimed in claim 6, wherein the communication processing unit further comprises a matching counter to store the count value.

9. The microcontroller as claimed in claim 8, wherein
the reset circuit checks whether the received set of driving codes matches at least one verification code;
the matching counter increases the count value by one when the received set of driving codes matches the at least one verification code;
the reset circuit checks whether a received set of second driving codes matches at least one verification code;
the matching counter increases the count value by one when the received set of second driving codes matches the at least one verification code;
the reset circuit checks whether a received set of third driving codes matches at least one verification code;
the matching counter increases the count value by one when the received set of third driving codes matches the at least one verification code; and
the reset circuit sets the in-system-programming flag when the count value is equal to a preset value.

10. The microcontroller as claimed in claim 8, wherein
the reset circuit sets a reset delay time after the in-system-programming flag is set; and the reset circuit executes the system reset after waiting for the reset delay time.

* * * * *